Figure 1:
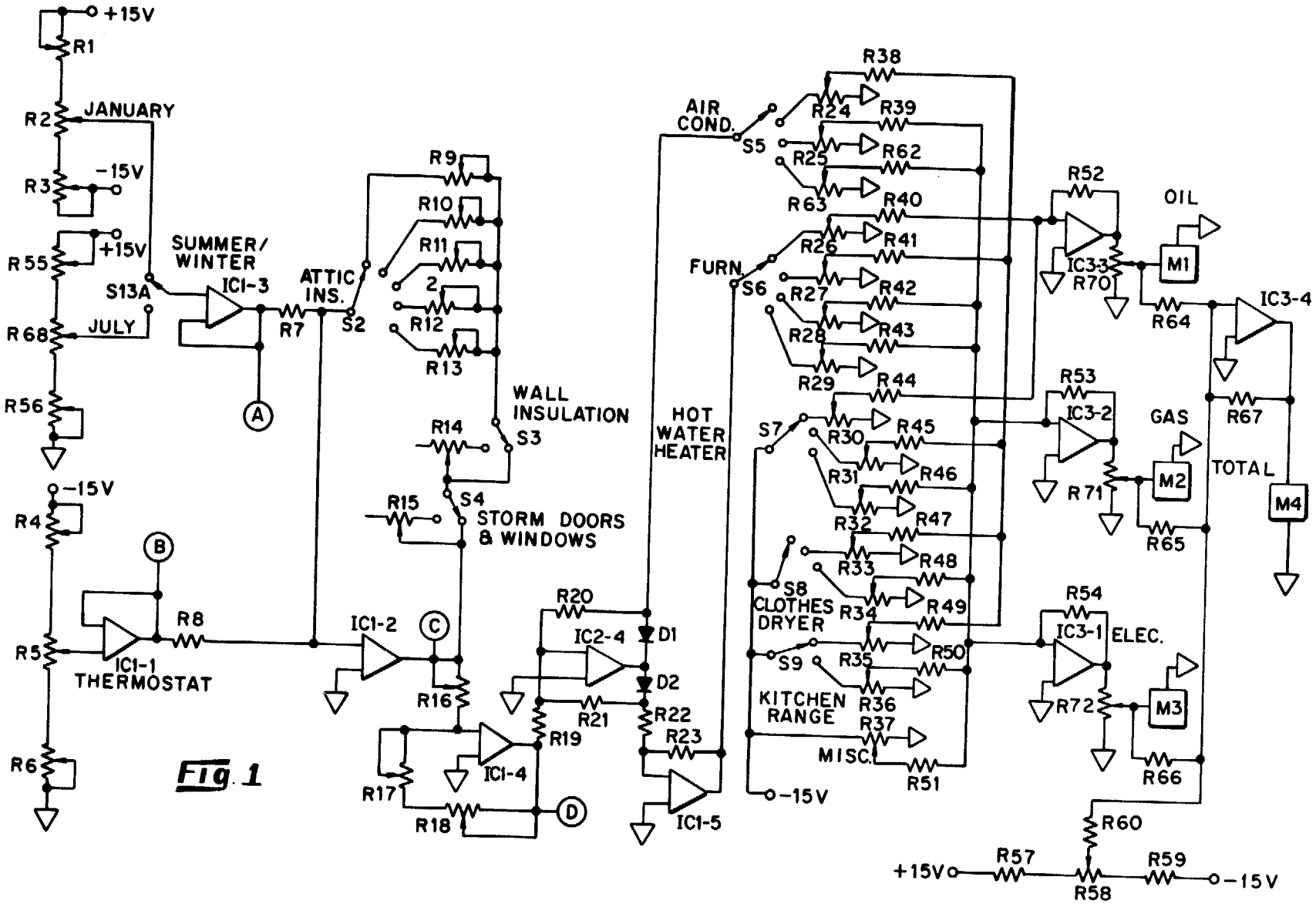
Figure 2:
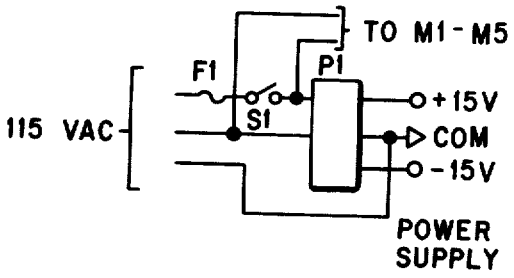
Figure 3:
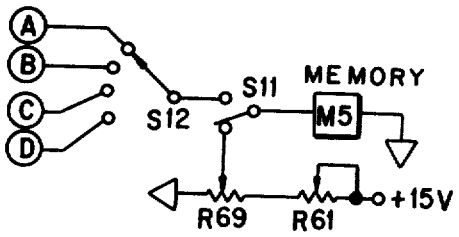

United States Defensive Publication [19] (H) [11] T979,007

Ogul et al. [43] Feb. 6, 1979

[54] ENERGY COST CALCULATOR

[75] Inventors: James E. Ogul, Frederick; Roger L. Gamble, Gaithersburg, both of Md.

[73] Assignee: The United States of America as represented by the United States Department of Energy, Washington, D.C.

[21] Appl. No.: 920,413

[22] Filed: Jun. 29, 1978

[51] Int. Cl.[2] ..... G06F 7/38

[52] U.S. Cl. ..... 364/900

[57] ABSTRACT

This invention relates to an electronic simulation device designed to simulate the energy system of a typical American household. This simulator is useful for informing building and heating contractors, architects, the financial community, homeowners, and concerned citizens of the impact of energy conservation measures available to them. The simulator has multiple controls for addressing information relating to space heating and cooling, hot water heating, appliances, lighting, climatic conditions, local costs of various sources of energy, amortization periods of capital equipment, and other variables as required. Digital meters on the panel of the device display the cost, in both dollars and energy units, of operating the household being modeled with instantaneous changes occuring as conditions are varied by the user. This permits the operator of the simulator to experiment with various combinations of household energy sources and conservation measures and to observe a digital readout of estimated monthly energy expenditure.

1 Claim, 2 Sheets Drawing,

12 Pages Specification

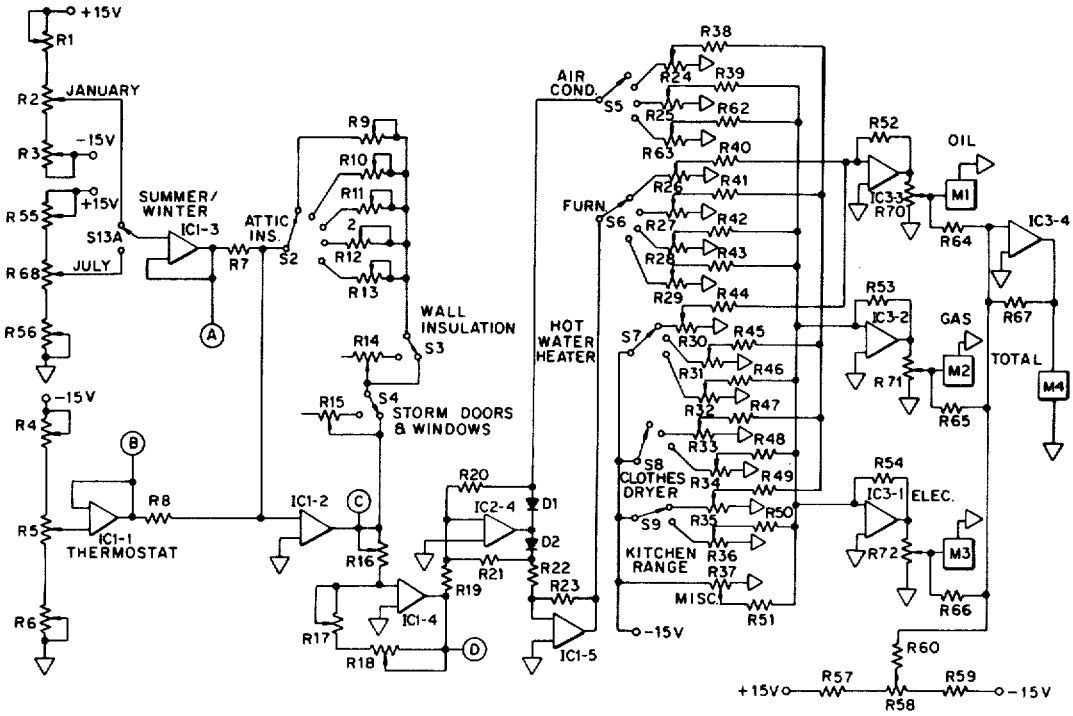

The file of this unexamined application may be inspected and copies thereof may be purchased (849 O.G. 1221, Apr. 9, 1968).